(12) United States Patent
Shim

(10) Patent No.: US 7,131,925 B2
(45) Date of Patent: Nov. 7, 2006

(54) SIX-SPEED POWERTRAIN OF AN AUTOMATIC TRANSMISSION FOR A VEHICLE

(75) Inventor: Hyu Tae Shim, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 171 days.

(21) Appl. No.: 11/024,868

(22) Filed: Dec. 28, 2004

(65) Prior Publication Data

US 2005/0192150 A1    Sep. 1, 2005

(30) Foreign Application Priority Data

Feb. 26, 2004    (KR)    ............... 10-2004-0013084

(51) Int. Cl.
*F16H 3/62*    (2006.01)

(52) U.S. Cl. ............... 475/277; 475/280; 475/281

(58) Field of Classification Search ......... 475/275–281
See application file for complete search history.

(56) References Cited

U.S. PATENT DOCUMENTS

| | | | | |
|---|---|---|---|---|
| 6,053,839 A | * | 4/2000 | Baldwin et al. ............ | 475/281 |
| 6,071,208 A | * | 6/2000 | Koivunen .................... | 475/275 |
| 7,029,417 B1 | * | 4/2006 | Borgerson et al. .......... | 475/284 |
| 7,056,258 B1 | * | 6/2006 | Bucknor et al. ............. | 475/275 |
| 2003/0119623 A1 | | 6/2003 | Stevenson et al. | |

FOREIGN PATENT DOCUMENTS

| | | |
|---|---|---|
| EP | 1 265 006 A2 | 12/2002 |
| JP | 08-254251 | 10/1996 |

* cited by examiner

*Primary Examiner*—Ha Ho
(74) *Attorney, Agent, or Firm*—Morgan Lewis & Bockius LLP

(57) ABSTRACT

The powertrain includes an arrangement of three single planetary gearsets of which operational elements are wisely interconnected to one another via two clutches and to the transmission via three brakes so as to form six forward speeds and one reverse speed, to be adaptable to a rear wheel drive vehicle.

4 Claims, 5 Drawing Sheets

FIG.2

| Speed \ Frictional element | C1 | C2 | B1 | B2 | B3 | OWC |
|---|---|---|---|---|---|---|
| 1st |  |  | ● | ○ |  | ● |
| 2nd |  |  | ● |  | ● |  |
| 3rd | ● |  | ● |  |  |  |
| 4th |  | ● | ● |  |  |  |
| 5th | ● | ● |  |  |  |  |
| 6th |  | ● |  |  | ● |  |
| R | ● |  |  | ● |  |  |

SIX-SPEED POWERTRAIN OF AN AUTOMATIC TRANSMISSION FOR A VEHICLE

CROSS-REFERENCE TO RELATED APPLICATION

This application claims priority to and the benefit of Korean Patent Application No. 10-2004-0013084 filed in the Korean Intellectual Property Office on Feb. 26, 2004, the entire content of which is incorporated herein by reference.

FIELD OF THE INVENTION

Generally, the present invention relates to a powertrain of an automatic transmission for a rear wheel drive vehicle enabling six forward speeds.

BACKGROUND OF THE INVENTION

A multi-stage gearshift mechanism of an automatic transmission includes a plurality of planetary gearsets. A powertrain having such a plurality of planetary gearsets varies the torque in multi-stages and outputs it to an output shaft when receiving a converted engine torque from a torque converter. The more speeds the powertrain of an automatic transmission has, the better power performance and fuel consumption. Therefore, it is desirable to have as many speeds as possible in powertrains.

Even for the same number of speeds, durability, power transmission efficiency, and size/weight of a transmission are substantially dependent on how planetary gearsets are arranged. Therefore, research for more structural strength, less power loss, and more compact packaging are under continuing investigation.

Usually, development of a powertrain using planetary gearsets does not devise wholly new type of planetary gearsets. To the contrary, it invokes how single/double pinion planetary gearsets are combined, and how clutches, brakes, and one-way clutches are disposed to the combination of planetary gearsets such that required shift speeds and speed ratios are realized with minimal power loss.

As for a manual transmission, too many speeds cause a driver the inconvenience of excessive manual shifting. However, for an automatic transmission, a transmission control unit automatically executes shifting by controlling the operation of the power train, and therefore, more speeds usually implies more merits.

Accordingly, research of four-speed and five-speed powertrains has been undertaken, and recently, a powertrain of an automatic transmission enabling six forward speeds and one reverse speed has been developed. Such six forward speed powertrains often include a Lavingneaux planetary gearset in the rear and a single pinion planetary gearset in the front.

A Lavingneaux type planetary gearset usually has drawbacks in consumption of volume and weight. Therefore, such powertrains for a rear wheel drive vehicle using a Lavingneaux type planetary gearset together with a single pinion planetary gearset results in inferiority in production efficiency. Furthermore, such Lavingneaux type planetary gearsets show inferior durability in comparison with single pinion planetary gearsets.

The information disclosed in this Background of the Invention section is only for enhancement of understanding of the background of the invention and should not be taken as an acknowledgement or any form of suggestion that this information forms the prior art that is already known in this country to a person of ordinary skill in the art.

SUMMARY

The present invention has been made in an effort to provide a powertrain of an automatic transmission for a rear wheel drive vehicle having advantages of small volume, light weight, durability, and production efficiency.

An exemplary six-speed powertrain of an automatic transmission for a rear wheel drive vehicle according to an embodiment of the present invention includes: a first planetary gearset of a single pinion planetary gearset having a first sun gear, a first planet carrier, and a first ring gear; a second planetary gearset of a single pinion planetary gearset having a second sun gear, a second planet carrier, and a second ring gear; and a third planetary gearset of a single pinion planetary gearset having a third sun gear, a third planet carrier, and a third ring gear.

In the previously mentioned powertrain, the first ring gear and the second planet carrier, the second ring gear and the third planet carrier, and the third ring gear and the first planet carrier are fixedly interconnected respectively. The second sun gear is fixedly connected to an input shaft so as to always act as an input element. The third sun gear is variably connected to the input shaft and the transmission case interposing a first clutch and a third brake respectively. The second planet carrier is variably connected to the input shaft interposing a second clutch. The third planet carrier is variably connected to the transmission case interposing a second brake and a one-way clutch. The first planet carrier is connected to an output gear. The first sun gear is variably connected to the transmission housing interposing a first brake.

In a further embodiment, the first and second clutches and the second and third brakes are disposed to the front in the transmission case, and the first brake is disposed to the rear in the transmission case.

In another further embodiment, the one-way clutch and the second brake are connected to the third planet carrier in parallel.

In another further embodiment, the output gear is disposed opposite to the input shaft with respect to the first, second, and third planetary gearsets

BRIEF DESCRIPTION OF THE DRAWINGS

The accompanying drawings illustrate exemplary embodiments of the present invention, and, together with the description, serve to explain the principles of the present invention, wherein:

FIG. 2 is an operational chart for a powertrain according to an embodiment of the present invention;

DETAILED DESCRIPTION OF THE EMBODIMENTS

An embodiment of the present invention will hereinafter be described in detail with reference to the accompanying drawings.

Figure 1:
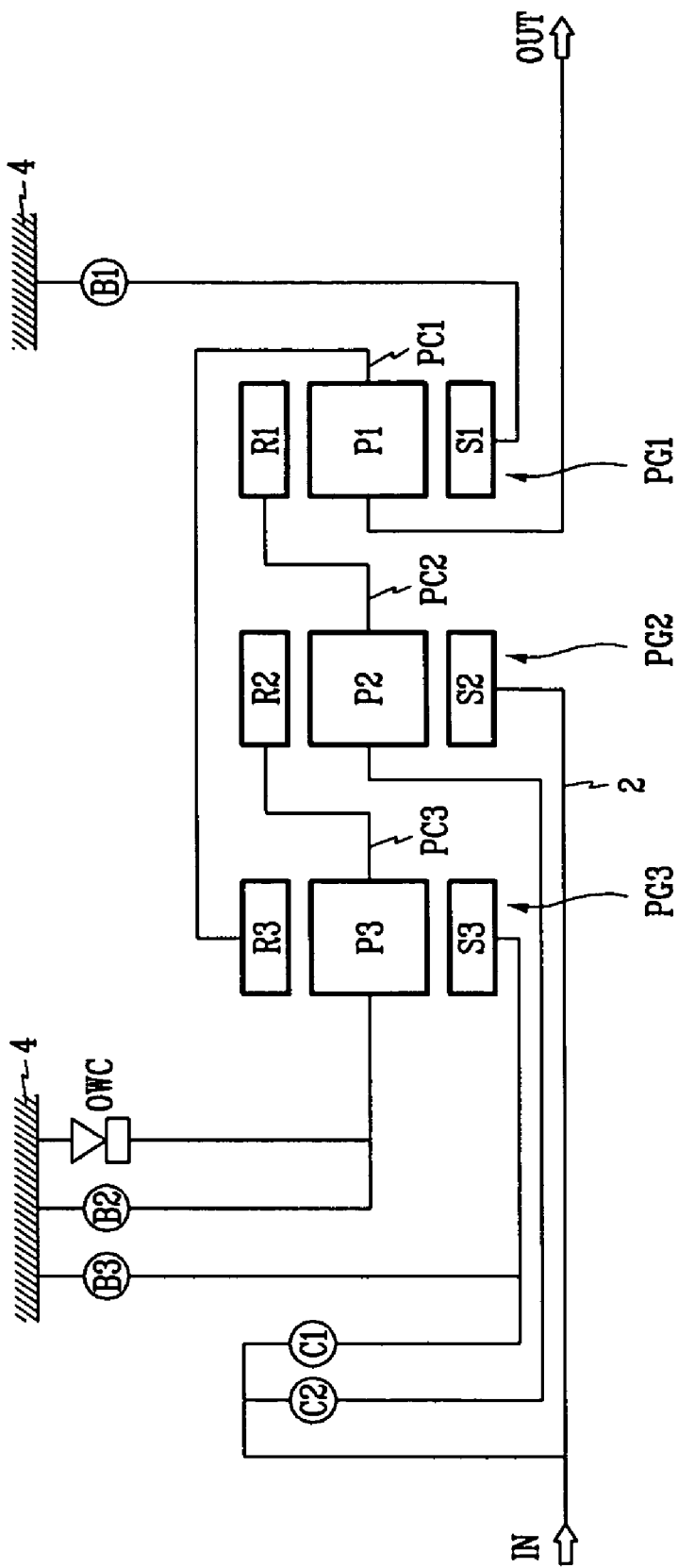
FIG. 1 is a schematic diagram of a powertrain according to an embodiment of the present invention.

FIG. 1 is a schematic diagram of a powertrain according to an embodiment of the present invention. The powertrain has a combination of first, second, and third planetary gearsets PG1, PG2, and PG3 on an input shaft 2 connected to an engine via a torque converter. The first planetary gearset PG1 is a single pinion planetary gearset having a first sun gear S1, a first ring gear R1, and a first planet carrier PC1 rotatably supporting first planetary gears P1 engaged with the first sun gear S1 and the first ring gear R1 therebetween.

The second planetary gearset PG2 is a single pinion planetary gearset having a second sun gear S2, a second ring gear R2, and a second planet carrier PC2 rotatably supporting second planetary gears P2 engaged with the second sun gear S2 and the second ring gear R2 therebetween. The third planetary gearset PG3 is a single pinion planetary gearset having a third sun gear S3, a third ring gear R3, and a third planet carrier PC3 rotatably supporting third planetary gears P3 engaged with the third sun gear S3 and the third ring gear R3 therebetween.

The first, second, and third planetary gearsets PG1, PG2, and PG3 are arranged in an order of the first, second, and third planetary gearsets PG1, PG2, and PG3 from a rear of the transmission. Among the operational elements, the first ring gear R1 and the second planet carrier PC2, the second ring gear R2 and the third planet carrier PC3, and the first planet carrier PC1 and the third ring gear R3 are fixedly interconnected, respectively.

The second sun gear S2 is fixedly connected to the input shaft 2 so as to always act as an input element. The third sun gear S3 and the second planet carrier PC2 are variably connected to the input shaft 2 interposing first and second clutches C1 and C2, respectively, and they respectively act as variable input elements.

In addition, the first sun gear S1 is variably connected to a transmission case 4 interposing a first brake B1. The third planet carrier PC3 is variably connected to the transmission case 4 interposing a second brake B2 and a one-way clutch OWC in parallel, so as to variably act as stationary elements. The third sun gear S3 is connected to the transmission case 4 interposing the third brake B3. The first planet carrier PC1 always acts as an output element.

In addition, the first and second clutches C1 and C2 and the second and third brakes B2 and B3 are disposed to the front (i.e., toward the input shaft) in the transmission case, and the first brake B1 is disposed to the rear (i.e., opposite to the input shaft) in the transmission case.

Such a powertrain is operated according to an operational chart of FIG. 2 so as to form six forward speeds and one reverse speed. That is, the first brake B1 and the one-way clutch OWC operate in the first forward speed, the first and third brakes B1 and B3 operate in the second forward speed, the first clutch C1 and the first brake B1 operate in the third forward speed, the second clutch C2 and the first brake B1 operate in the fourth forward speed, the first and second clutches C1 and C2 operate in the fifth forward speed, the second clutch C2 and the third brake B3 operate in the sixth forward speed, and first clutch C1 and the second brake B2 operate in the reverse speed. Regarding the first forward speed, the second brake B2 may be operated instead of the one-way clutch OWC for realizing an engine brake, so the operation of second brake B2 in the first speed is marked with an empty circle in FIG. 2.

Such a powertrain according to an embodiment of the present invention uses a combination of three single pinion planetary gearsets wherein the first ring gear R1 and the second planet carrier PC2, the second ring gear R2 and the third planet carrier PC3, the third ring gear R3 and the first planet carrier PC1 are fixedly interconnected respectively. Therefore, the operational elements may be understood to have 6 nodes as shown in FIG. 3.

In more detail, the second sun gear S2 corresponds to a first node N1, the third sun gear S3 corresponds to a second node N2, the first ring gear R1 and the second planet carrier PC2 correspond to a third node N3, the second ring gear R2 and the third planet carrier PC3 correspond to a fourth node N4, the first planet carrier PC1 and the third ring gear R3 correspond to a fifth node N5, and the first sun gear S1 corresponds to a sixth node N6, respectively.

Figure 3:
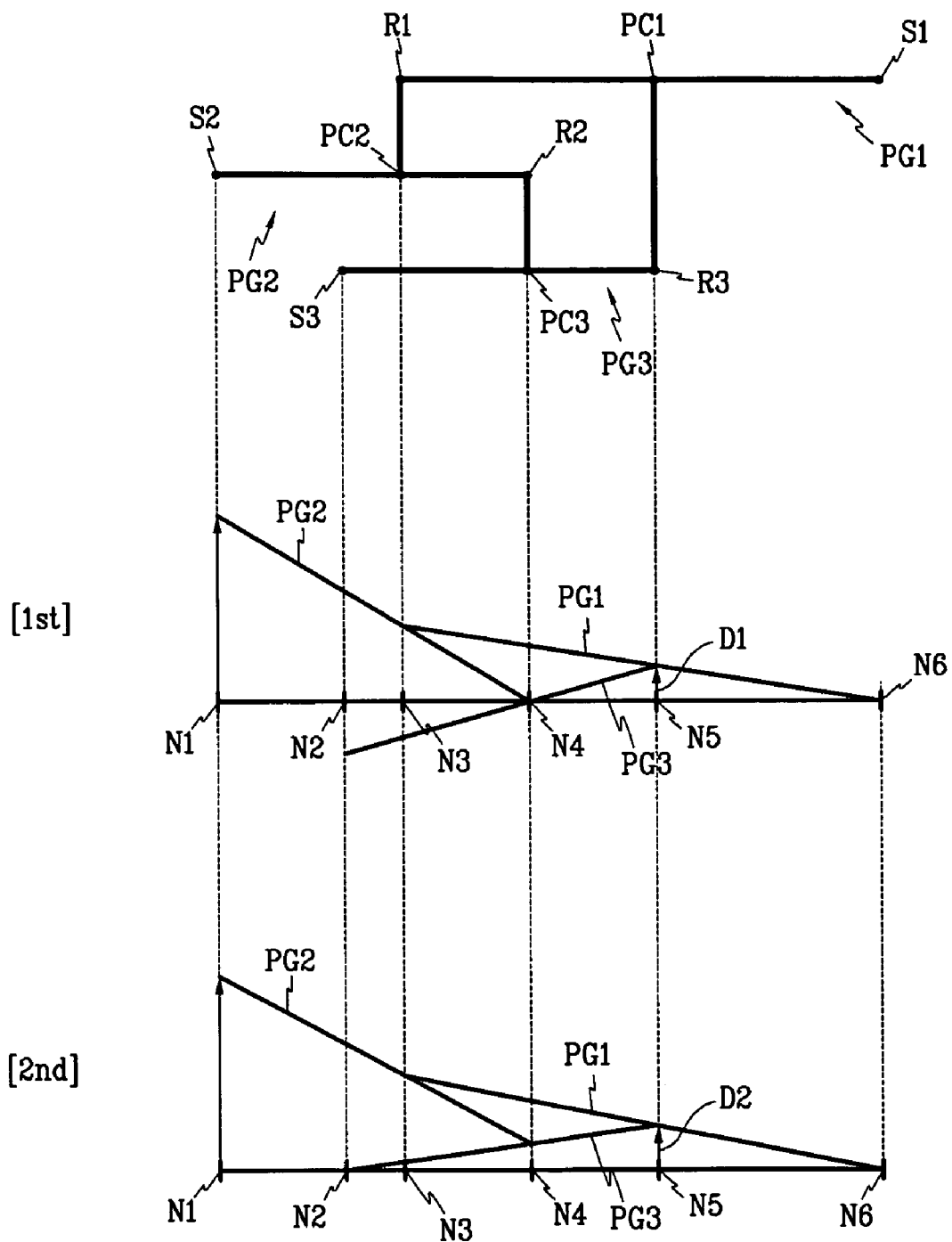
FIG. 3 shows lever diagrams for first and second forward speeds of a powertrain according to an embodiment of the present invention.
Figure 4:
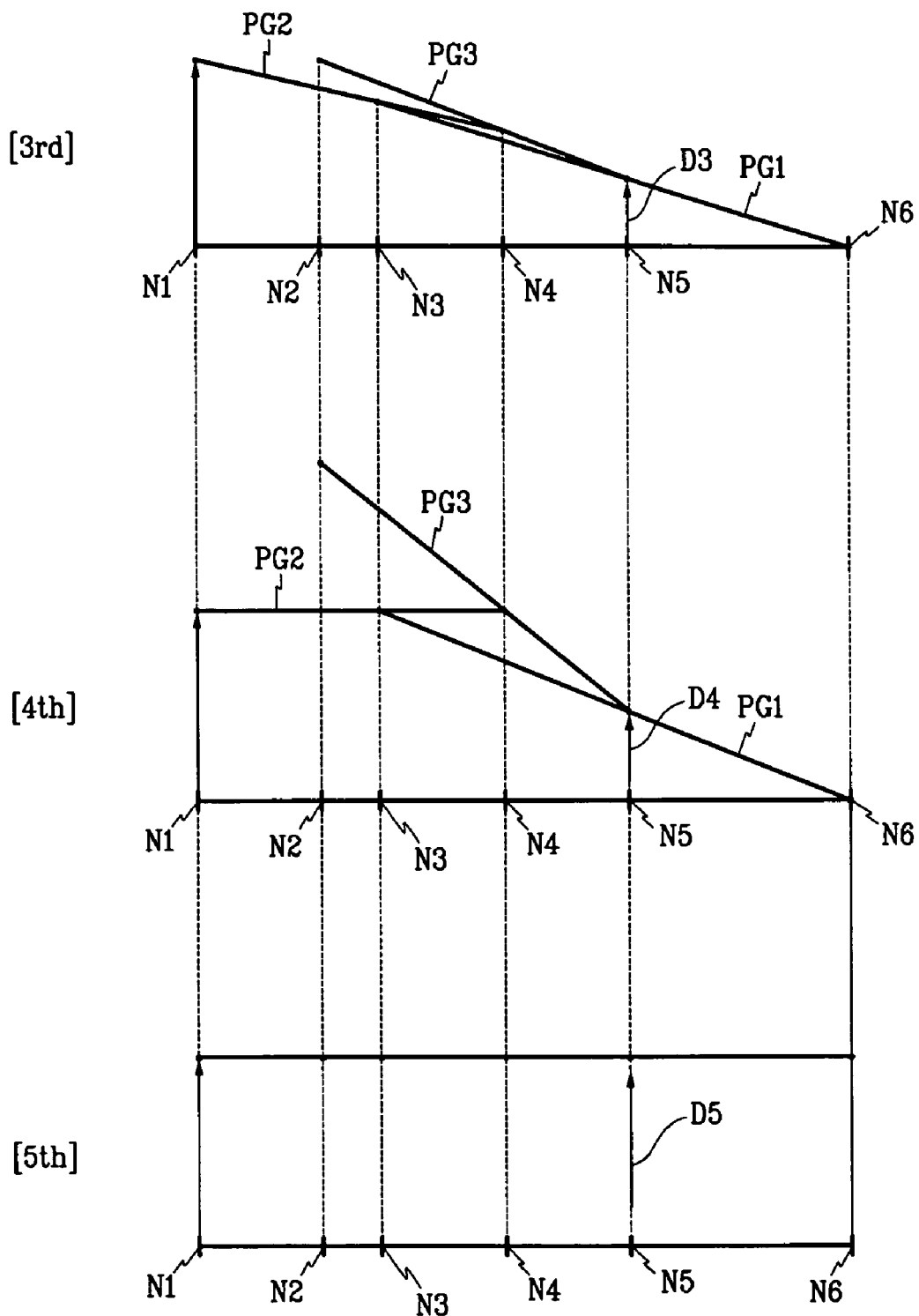
FIG. 4 shows lever diagrams for third, fourth, and fifth forward speeds of a powertrain according to an embodiment of the present invention.
Figure 5:
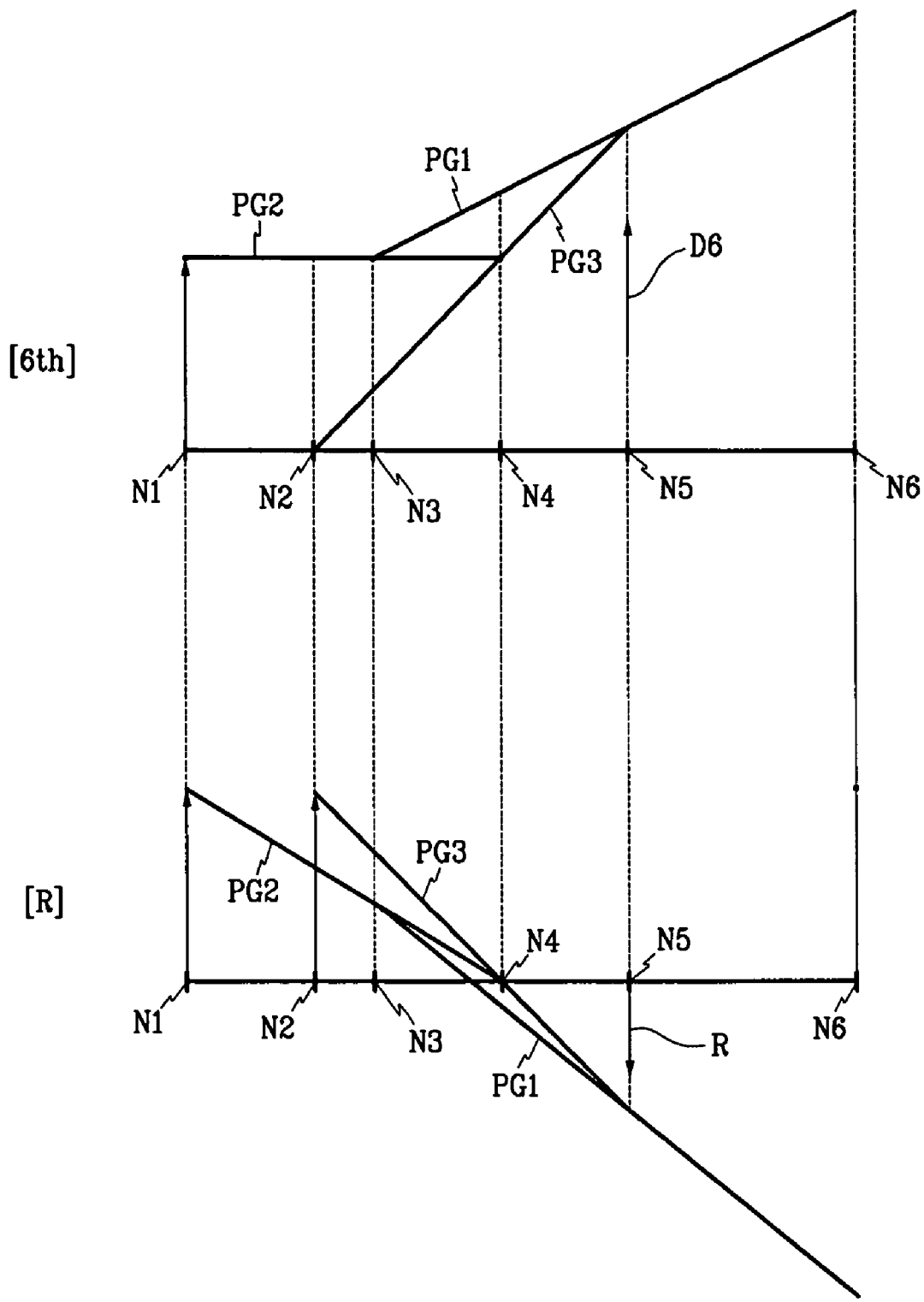
FIG. 5 shows lever diagrams for a sixth forward speed and a reverse speed of a powertrain according to an embodiment of the present invention.

FIGS. 3–5 are lever diagrams visualizing shifting of a powertrain according to an embodiment of the present invention. At the first forward speed, the first brake B1 and the one-way clutch OWC operate. Then, the fourth node N4 and the sixth node N6 act as stationary elements while the second sun gear S2 of the first node N1 receives input torque. Therefore, according to a cooperative reaction of the first, second, and third planetary gearsets PG1, PG2, and PG3, the speed diagram becomes as shown in a first speed diagram in FIG. 3. Therefore, shifting to the forward first speed is realized because speed is changed to and output as D1 through the output element of the fifth node N5.

At the second forward speed, the third brake B3 operates instead of the one way clutch OWC (or the second brake B2) in the first speed. Then, the second node N2 and the sixth node N6 act as stationary elements, while the second sun gear S2 of the first node N1 receives input torque. Therefore, according to a cooperative reaction of the first, second, and third planetary gearsets PG1, PG2, and PG3, the speed diagram becomes as shown in a second speed diagram in FIG. 3. Therefore, shifting to the forward second speed is realized because speed is changed to and output as D2 through the output element of the fifth node N5.

At the third forward speed, the third brake B3 is released and the first clutch C1 operates, in comparison with the second forward speed. Then, the sixth node N6 acts as a stationary element, while the second sun gear S2 of the first node N1 and the third sun gear S3 of the second node N2 receive input torque. Therefore, according to a cooperative reaction of the first, second, and third planetary gearsets PG1, PG2, and PG3, the speed diagram becomes as shown in a third speed diagram in FIG. 4. Therefore, shifting to the forward third speed is realized because speed is changed to and output as D3 through the output element of the fifth node N5.

At the fourth forward speed, the first clutch C1 is released and the second clutch C2 operates, in comparison with the third speed. Then, the sixth node N6 acts as a stationary element while second sun gear S2 of the first node N1 and the second carrier PC2 of the third node N3 receive input torque. Therefore, according to a cooperative reaction of the first, second, and third planetary gearsets PG1, PG2, and PG3, the speed diagram becomes as shown in a fourth speed diagram in FIG. 4. Therefore, shifting to the forward fourth speed is realized because speed is changed to and output as D4 through the output element of the fifth node N5.

At the fifth forward speed, the first brake B1 is released and the first clutch C1 operates, in comparison with the fourth speed. Then, no stationary element is formed while the second sun gear S2 of the first node N1 and the third sun gear S3 of the second node N2 receive input torque. Therefore in this case, the first, second, and third planetary gearsets PG1, PG2, and PG3 integrally rotate. Therefore, shifting to the fifth forward speed is realized because the speed is changed to and output as D5 through the output element of the fifth node N5 as shown in the fifth speed diagram in FIG. 4.

At the sixth forward speed, the first clutch C1 is released and the third brake B3 operates, in comparison with the fifth speed. Then, the second node N2 acts as a stationary element while the second sun gear S2 of the first node N1 and the second carrier PC2 of the third node N3 receive input torque. Therefore, according to a cooperative reaction of the first, second, and third planetary gearsets PG1, PG2, and PG3, the speed diagram becomes as shown in a sixth speed diagram in FIG. 5. Therefore, shifting to the forward sixth speed is realized because speed is changed to and output as D6 through the output element of the fifth node N5.

At the reverse speed, the first clutch C1 and the second brake B2 operate. Then, the fourth node N4 acts as a stationary element while the second sun gear S2 of the first node N1 and the third sun gear S3 of the second node N2 receive input torque. Therefore, according to a cooperative reaction of the first, second, and third planetary gearsets PG1, PG2, and PG3, the speed diagram becomes as shown in a reverse speed diagram in FIG. 5. Therefore, shifting to the reverse speed is realized because speed is changed to and output as R through the output element of the fifth node N5. Details of drawing speed diagrams for each planetary gearset at each speed are obvious from the above description, and are not described in further detail.

A powertrain according to an embodiment of the present invention shows speed ratios of 4.793 at the first forward speed, 2.796 at the second forward speed, 1.776 at the third forward speed, 1.342 at the fourth forward speed, 1.000 at the fifth forward speed, and 0.777 at the sixth forward speed. Accordingly, step ratios of speed ratios at each speed are optimally formed.

According to a powertrain according to an embodiment of the present invention, single pinion planetary gearsets which generally occupy less volume and show less weight are dominantly used. Therefore, durability and production efficiency of a transmission are enhanced due to obviation of necessity of using a Lavingneaux type planetary gearset.

In addition, all the clutches are disposed to the front, and accordingly, hydraulic paths thereto may be shortened. Usage of the one way clutch enhances responsiveness in shifting.

While this invention has been described in connection with what is presently considered to be the most practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A six-speed powertrain of an automatic transmission for a rear wheel drive vehicle, comprising:
   a first planetary gearset of a single pinion planetary gearset having a first sun gear, a first planet carrier, and a first ring gear;
   a second planetary gearset of a single pinion planetary gearset having a second sun gear, a second planet carrier, and a second ring gear; and
   a third planetary gearset of a single pinion planetary gearset having a third sun gear, a third planet carrier, and a third ring gear, wherein:
   the first ring gear and the second planet carrier, the second ring gear and the third planet carrier, and the third ring gear and the first planet carrier are fixedly interconnected respectively;
   the second sun gear is fixedly connected to an input shaft so as to always act as an input element;
   the third sun gear is variably connected to the input shaft and a transmission case interposing a first clutch and a third brake respectively;
   the second planet carrier is variably connected to the input shaft interposing a second clutch;
   the third planet carrier is variably connected to the transmission case interposing a second brake and a one-way clutch;
   the first planet carrier is connected to an output gear;
   the first sun gear is variably connected to the transmission case interposing a first brake.

2. The powertrain of claim 1, wherein:
   the first and second clutches and the second and third brakes are disposed to the front in the transmission case; and
   the first brake is disposed to the rear in the transmission case.

3. The powertrain of claim 1, wherein the one-way clutch and the second brake are connected to the third planet carrier in parallel.

4. The powertrain of claim 1, wherein the output gear is disposed opposite to the input shaft with respect to the first, second, and third planetary gearsets.

* * * * *